(12) United States Patent
Choe et al.

(10) Patent No.: US 11,697,424 B2
(45) Date of Patent: Jul. 11, 2023

(54) HEALTH DIAGNOSIS OF HYBRID POWERPLANT

(71) Applicant: Hamilton Sundstrand Corporation, Charlotte, NC (US)

(72) Inventors: Jung Muk Choe, Vernon, CT (US); Michael C. Harke, DeForest, WI (US); Xin Wu, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 165 days.

(21) Appl. No.: 16/791,513

(22) Filed: Feb. 14, 2020

(65) Prior Publication Data
US 2021/0253117 A1 Aug. 19, 2021

(51) Int. Cl.
*B60W 50/04* (2006.01)
(52) U.S. Cl.
CPC .................. *B60W 50/045* (2013.01)
(58) Field of Classification Search
CPC ................. B60W 50/045; B64D 27/24; B64D 2027/026; B64F 5/60; G05B 23/0256; F05D 2220/323; F05D 2220/76; F05D 2260/80; F05D 2260/821; F05D 2270/11; F01D 15/10; F01D 21/003
USPC .......................................................... 701/22
See application file for complete search history.

(56) References Cited

U.S. PATENT DOCUMENTS

| 9,477,223 | B2 | 10/2016 | Shaikh et al. |
| 9,506,401 | B2 * | 11/2016 | Bacic .................... F01D 21/003 |
| 2018/0224829 | A1 | 8/2018 | Iijima et al. |
| 2018/0224830 | A1 * | 8/2018 | Iijima .................. G05B 19/416 |
| 2019/0120078 | A1 | 4/2019 | Haye |

FOREIGN PATENT DOCUMENTS

| CN | 102840882 A | 12/2012 |
| EP | 1376287 * | 1/2004 |
| EP | 1376287 A1 * | 1/2004 |
| EP | 3110657 A1 | 1/2017 |
| EP | 3418504 A1 * | 12/2018 |
| EP | 3418504 A1 * | 12/2018 |
| GB | 2488805 A | 9/2012 |
| WO | 201823572 A1 | 12/2018 |

OTHER PUBLICATIONS

Extended European search report issued in corresponding EP application No. 21156836.5, dated May 19, 2021.

* cited by examiner

*Primary Examiner* — Muhammad Shafi
(74) *Attorney, Agent, or Firm* — Locke Lord LLP; Daniel J. Fiorello; Gabrielle L. Gelozin

(57) ABSTRACT

A method can include perturbing an electric motor of a hybrid powerplant having the electric motor and a fuel powered engine. The method can include measuring a frequency response of the powerplant due to the perturbing of the electric motor to determine a health of the powerplant and/or one or more components thereof.

17 Claims, 4 Drawing Sheets

HEALTH DIAGNOSIS OF HYBRID POWERPLANT

FIELD

This disclosure relates to powerplants, e.g., to hybrid powerplants.

BACKGROUND

A hybrid gas turbine engine, for example, can be connected with a motor, shaft, gear box, combustor, and blade. Each component has its own inertia, and each connection has a spring coefficient and friction. Traditionally, measuring a whole plant model of a gas turbine engine is practically impossible.

Such conventional methods and systems have generally been considered satisfactory for their intended purpose. However, there is still a need in the art for improved health diagnosis for hybrid powerplants. The present disclosure provides a solution for this need.

SUMMARY

A method can include perturbing an electric motor of a hybrid powerplant having the electric motor and a fuel powered engine. The method can include measuring a frequency response of the powerplant due to the perturbing of the electric motor to determine a health of the powerplant and/or one or more components thereof.

The method can include comparing an expected frequency response to the measured frequency response to determine a health of the powerplant and/or the one or more components thereof. Perturbing the electric motor can include modifying a set input speed value with a varying value. For example, the varying value can be a sinusoidal sweep.

Modifying the set input speed value can include summing the set input speed value with the varying value at a first summing block to output a modified input speed value. Perturbing the electric motor can include inputting the modified input speed value into a second summing block to subtract a feedback speed to output an error input to a speed controller. In certain embodiment, the method can include filtering the feedback speed through one or more filter modules. Perturbing the electric motor can include using the speed controller to control a speed of the electric motor as a function of the error input, thereby varying speed of the electric motor as a function of the varying value. Measuring the frequency response can include measuring an output of the vibrational output of the powerplant.

In certain embodiments, comparing an expected frequency response to the measured frequency response can include comparing an expected magnitude of one or both of a resonant frequency or an anti-resonant frequency of the expected frequency response with a magnitude of one or both of a resonant frequency or an anti-resonant frequency of the measured frequency response to determine if there is a shaft stiffness change. In certain embodiments, comparing an expected frequency response to the measured frequency response can include comparing one or more of an expected resonant frequency, an expected anti-resonant frequency, or an expected phase plot of the expected frequency response with a respective measured resonant frequency, measured anti-resonant frequency, and/or a measured phase plot of the measured frequency response to determine if there is an inertial change in the powerplant. Any other suitable comparison to determine a health characteristic of the powerplant and/or one or more components thereof (e.g., a common shaft with the electric motor and the fuel powered engine, a gear box, an accessory, any other device mechanically connected or related to the electric motor) is contemplated herein.

In certain embodiments, the fuel powered engine can be a gas turbine engine. Any other suitable engine is contemplated herein. The method can include any other suitable method(s) and/or portions thereof.

In accordance with at least one aspect of this disclosure, a system for diagnosing a health of a hybrid powerplant can include a health module configured to perturb an electric motor of a hybrid powerplant having the electric motor and a fuel powered engine, and measure a frequency response of the powerplant due to the perturbing of the electric motor to determine a health of the powerplant and/or one or more components thereof. The health module can be configured to perform any embodiment of a method, e.g., as disclosed herein (e.g., as described above).

In accordance with at least one aspect of this disclosure, a hybrid electric powerplant can include an electric motor, a fuel powered engine, and any embodiment of a health module, e.g., as disclosed herein (e.g., as described above). The powerplant can include any other suitable components. The fuel powered engine can be a gas turbine engine, for example, or any other suitable type of engine.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
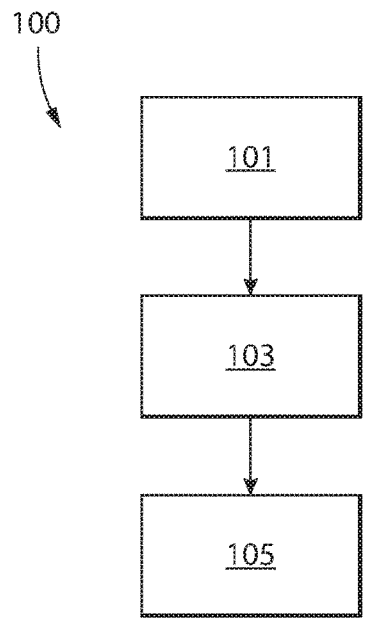
FIG. 1 is a flow diagram of an embodiment of a method in accordance with this disclosure.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIGS. 2-5. Certain embodiments described herein can be used to conduct health diagnostics of a hybrid powerplant (e.g., having a turbomachine) and/or or one or more components thereof (e.g., one or more turbomachine components).

Figure 2:
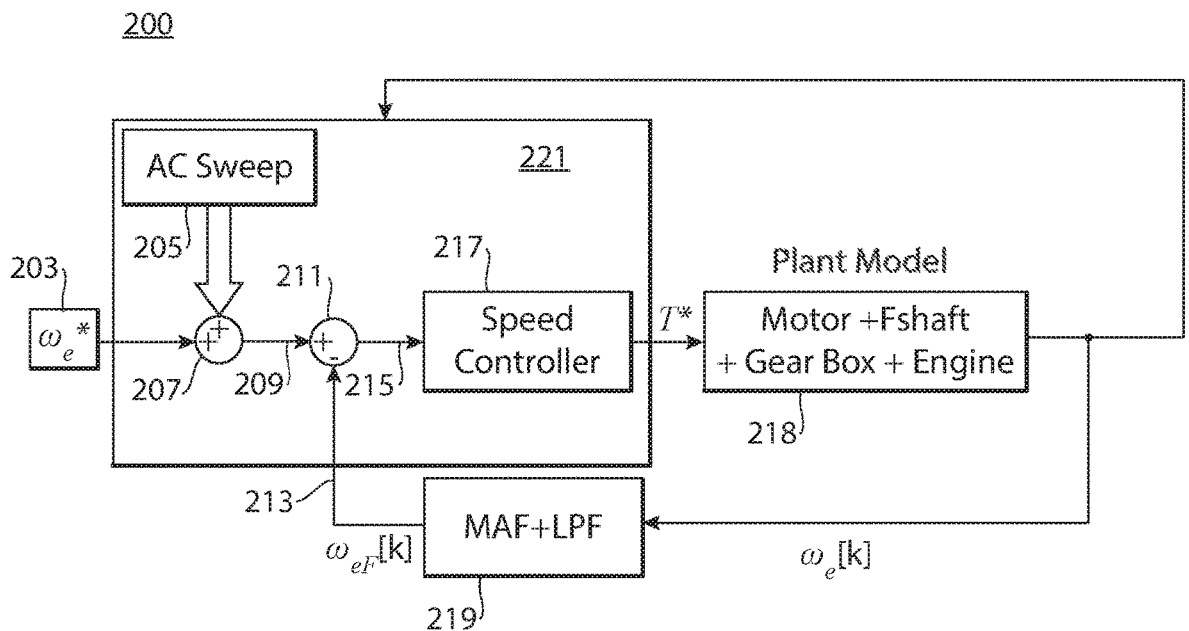
FIG. 2 is a schematic diagram of a control system in accordance with this disclosure.

Referring to FIGS. 1 and 2, a method 100 can include perturbing (e.g., at block 101) an electric motor of a hybrid powerplant 218 having the electric motor and a fuel powered engine. The method 100 can include measuring (e.g., at block 103) a frequency response of the powerplant 218 due to the perturbing (e.g., 101) of the electric motor to determine a health of the powerplant and/or one or more components thereof (e.g., a shaft stiffness, a gear box resistance, etc.).

Figure 3:
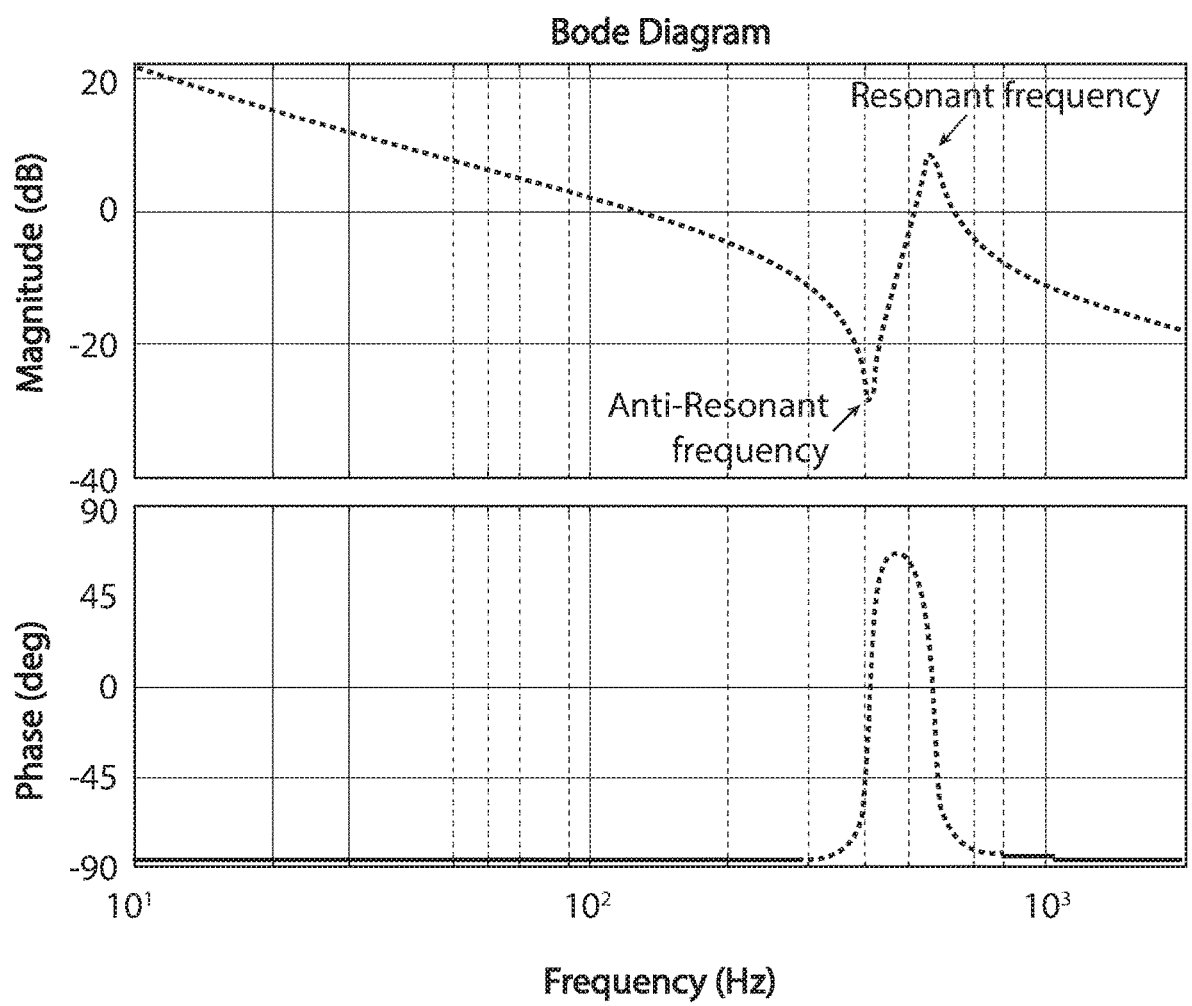
FIG. 3 is a bode diagram of an embodiment of expected frequency response in accordance with this disclosure.
Figure 4:
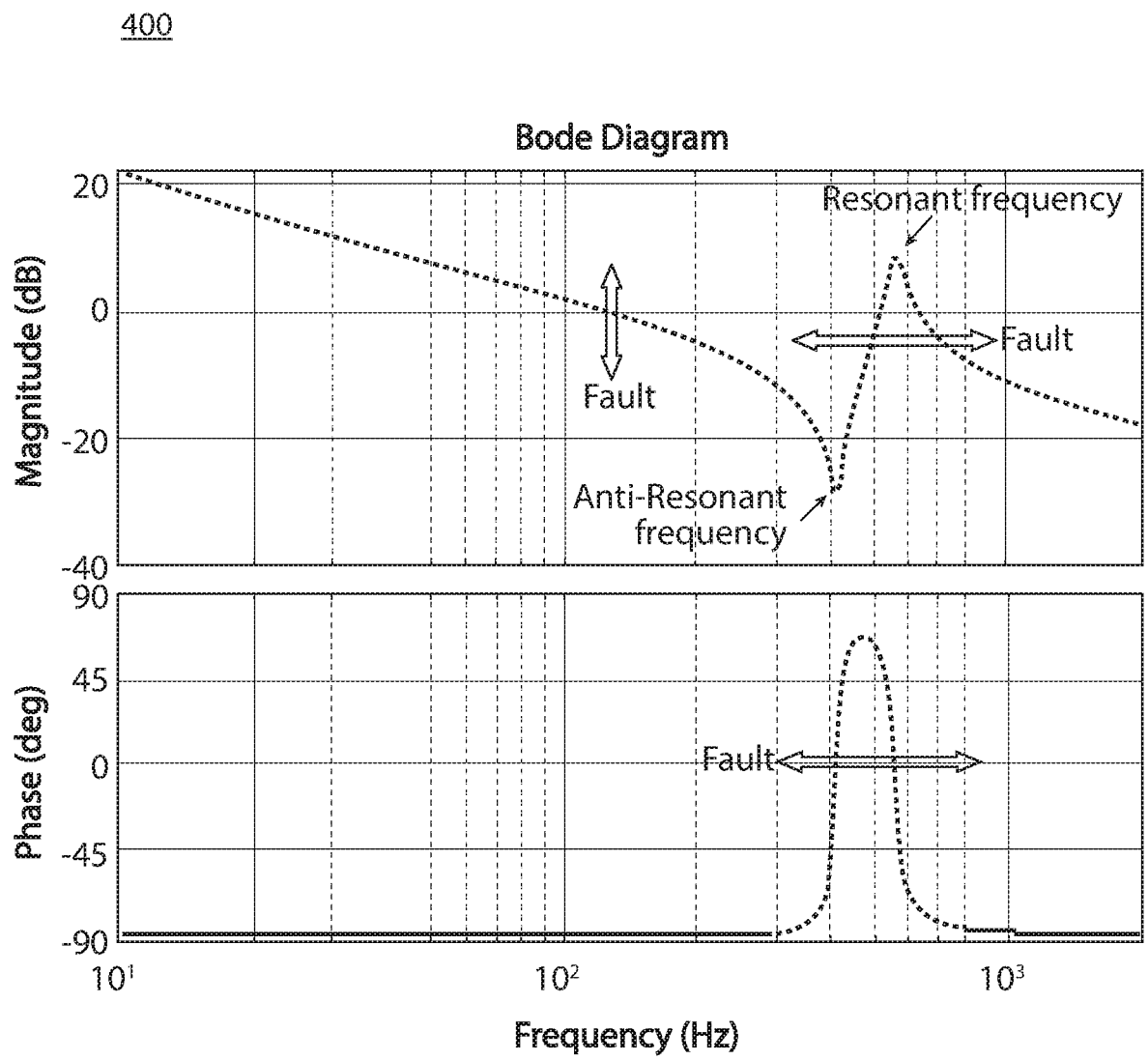
FIG. 4 is a bode diagram of an embodiment of a measured frequency response in accordance with this disclosure.

Referring to FIGS. 3 and 4, the method 100 can include comparing (e.g., at block 105) an expected frequency response 300 to the measured frequency response 400 to determine a health of the powerplant and/or the one or more components thereof. Perturbing (e.g., block 101) the electric motor can include modifying a set input speed value 203 with a varying value 205. For example, the varying value 205 can be a sinusoidal sweep (e.g., an AC sweep as shown).

Modifying the set input speed value can include summing the set input speed value 203 with the varying value 205 at a first summing block 207 to output a modified input speed value 209. Perturbing (e.g., at block 101) the electric motor can include inputting the modified input speed value into a second summing block 211 to subtract a feedback speed 213 to output an error input 215 to a speed controller 217. In certain embodiment, the method 100 can include filtering the feedback speed through one or more filter modules 219 (e.g., a low pass filter, a moving average filter, or any suitable combination thereof), for example.

Perturbing (e.g., at block 101) the electric motor can include using the speed controller 217 to control a speed of the electric motor as a function of the error input 215, thereby varying speed of the electric motor as a function of the varying value 205. The speed controller 217 can input a torque into a plant model of the powerplant 218. The plant model can be configured to receive a torque value from the speed controller 217 and convert the torque value to suitable electrical signals for providing such torque based on one or more plant characteristics, for example. Measuring the frequency response can include measuring an output of the vibrational output of the powerplant 218.

In certain embodiments, comparing (e.g., at block 105) an expected frequency response to the measured frequency response can include comparing an expected magnitude of one or both of a resonant frequency or an anti-resonant frequency of the expected frequency response with a magnitude of one or both of a resonant frequency or an anti-resonant frequency of the measured frequency response (e.g., as shown in FIGS. 3 and 4) to determine if there is a shaft stiffness change or a turbomachine shaft, for example. It is contemplated that this type of comparison can be used to determine any other suitable condition of the powerplant and/or any suitable components thereof.

Figure 5:
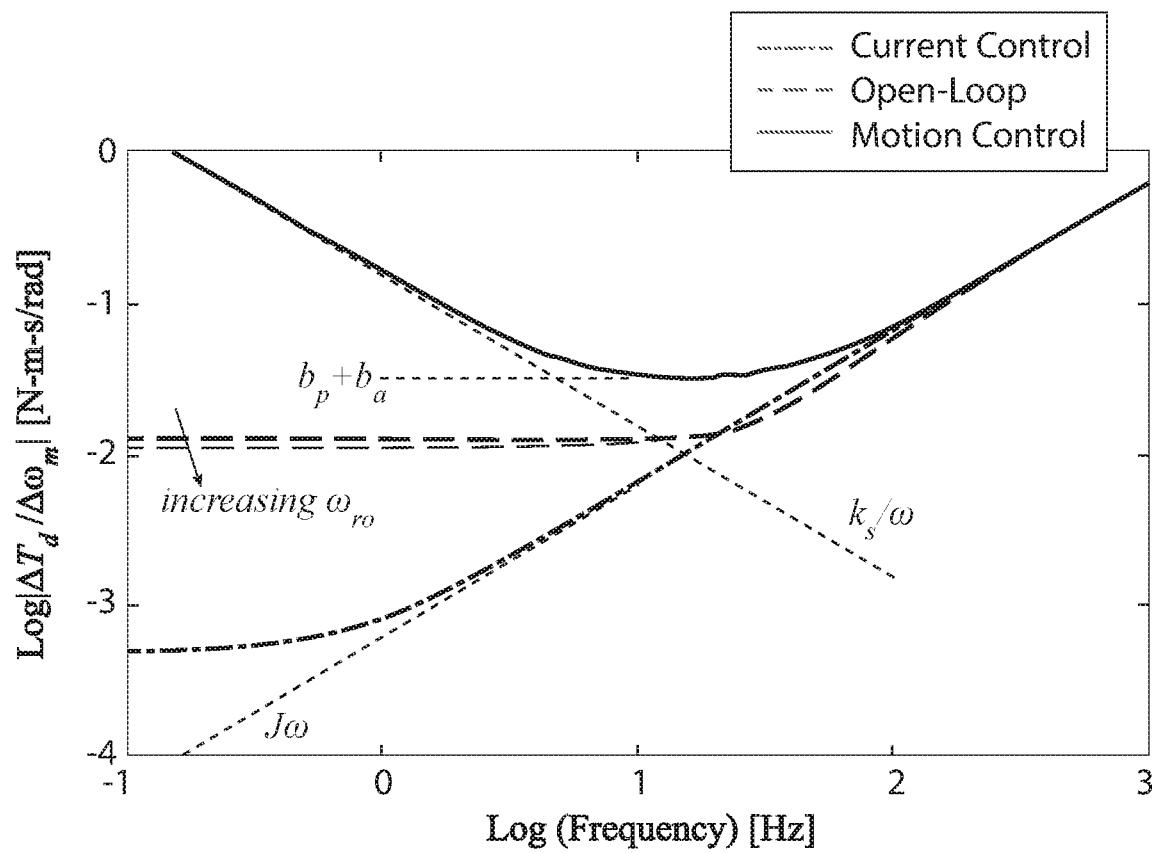
FIG. 5 is a bode diagram of two different frequency pole at constant speed.

In certain embodiments, comparing (e.g., at block 105) an expected frequency response to the measured frequency response can include comparing one or more of an expected resonant frequency, an expected anti-resonant frequency, or an expected phase plot of the expected frequency response with a respective measured resonant frequency, measured anti-resonant frequency, and/or a measured phase plot of the measured frequency response (e.g., as shown in FIGS. 3 and 4) to determine if there is an inertial change in the powerplant. It is contemplated that this type of comparison can be used to determine any other suitable condition of the powerplant and/or any suitable components thereof. Any other suitable comparison to determine a health characteristic of the powerplant and/or one or more components thereof (e.g., a common shaft with the electric motor and the fuel powered engine, a gear box, an accessory, any other device mechanically connected or related to the electric motor) is contemplated herein. FIG. 5 shows a bode diagram of two different frequency pole at constant speed for measurement of stiffness. By putting AC seep in torque controller, dynamic stiffness can be measured.

In certain embodiments, the fuel powered engine can be a gas turbine engine. Any other suitable engine is contemplated herein. The method can include any other suitable method(s) and/or portions thereof. Embodiments of a method and/or any portion(s) thereof can implemented by any suitable computerized device having any suitable hardware and/or software modules. One or more embodiments of a method can be stored on a non-transitory computer readable medium to be executable by a suitable computerized device.

While the embodiment shown modifies an input ahead of the speed controller, in certain embodiments, the speed controller can receive an unmodified input speed value and modify it (e.g., with an AC sweep) internally instead of summing the input value ahead of the speed controller. Any other suitable way to perturb the electric motor is contemplated herein.

In accordance with at least one aspect of this disclosure, a system 200 for diagnosing a health of a hybrid powerplant can include a health module 221 configured to perturb an electric motor of a hybrid powerplant 218 having the electric motor and a fuel powered engine. The health module 221 can be configured to measure a frequency response of the powerplant 218 due to the perturbing of the electric motor to determine a health of the powerplant and/or one or more components thereof. The health module 221 can be configured to perform any embodiment of a method, e.g., as disclosed herein (e.g., as described above).

The system 200 can include the speed controller 221, which can have any suitable hardware and/or software module(s). In certain embodiments, e.g., as shown, the speed controller 217 can be included in the health module 221, or vice versa. The system 200 can also include the powerplant 218 (e.g., which can receive torque and/or speed commands from the speed controller 217 to control a speed of the electric motor) and/or any other suitable components, e.g., a filter module 219, power electronics for powering the electric motor, and/or one or more vibrational sensors (e.g., connected to the powerplant 218 or any suitable component(s) thereof) for measuring frequency response (e.g., an providing one or more measurement signals to the health module 221). The health module 221 can include any suitable components of system 200 (e.g., all processing modules), for example.

In accordance with at least one aspect of this disclosure, a hybrid electric powerplant 218 can include an electric motor, a fuel powered engine, and any embodiment of a health module, e.g., as disclosed herein (e.g., as described above). The powerplant 218 can include any other suitable components. The fuel powered engine can be a gas turbine engine (e.g., a turbofan, a turboprop), for example, or any other suitable type of engine.

Certain embodiments include a speed control loop that includes an AC sweep injected into a speed reference ahead of speed controller, for example. The speed controller can receive a speed error and be configured to input more or less power to the electric motor to track the input value such that speed error is moved toward zero. A plant model can have information about mechanical system, receive a torque value, and convert it to electrical signals for providing such torque.

Embodiments can selectively run a health check, e.g., when an aircraft is on the ground. When health check is run (on ground), the AC sweep can be input to modify the target speed that the speed controller is tracking, and the response to this changing target can be monitored. For example, if slope or position changes, an inertia change and/or mechanical connection issue can be determined (e.g., and reported to a user). For example, with an inertia increase, a resonant frequency would be decreased. For shaft stiffness, for example, changes in resonant frequency magnitude and anti-resonant frequency magnitude would be seen. Any suitable type of change of response can be correlated to one or more conditions as appreciated by those having ordinary skill in the art in view of this disclosure. In view of this disclosure, one having ordinary skill in the art is enabled without under experimentation to correlate any suitable fault to changes in measured data.

Traditional mechanical turbomachines do not provide an avenue to detect mechanical connection faults without additional sensing systems or inspection. Embodiments can provide health diagnosis (e.g., on ground) for a hybrid engine using frequency response analysis. Embodiments allow health diagnosis for engine mechanical connections, for example, without dedicated sensing or inspection for such diagnosis. The diagnosis can be done quickly with small power when an airplane is on ground, for example. Embodiments allow complicated engine connections to be checked by comparing a frequency response result and/or a dynamic stiffness $T/\omega$ (or $\theta$).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A method performed by a health module of a health diagnostic system, comprising the steps of:
   perturbing an electric motor of a hybrid powerplant having the electric motor and a fuel powered engine;
   measuring a frequency response of the powerplant due to the perturbing of the electric motor to determine a health of the powerplant and/or one or more components thereof; and
   comparing an expected frequency response to the measured frequency response to determine a health of the powerplant and/or the one or more components thereof.

2. The method of claim 1, wherein comparing includes comparing an expected magnitude of one or both of a resonant frequency or an anti-resonant frequency of the expected frequency response with a magnitude of one or both of a resonant frequency or an anti-resonant frequency of the measured frequency response to determine if there is a shaft stiffness change.

3. The method of claim 1, wherein comparing includes comparing one or more of an expected resonant frequency, an expected anti-resonant frequency, or an expected phase plot of the expected frequency response with a respective measured resonant frequency, measured anti-resonant frequency, and/or a measured phase plot of the measured frequency response to determine if there is an inertial change in the powerplant.

4. The method of claim 1, perturbing the electric motor includes modifying a set input speed value with a varying value.

5. The method of claim 4, wherein the varying value is a sinusoidal sweep.

6. The method of claim 4, wherein modifying the set input speed value includes summing the set input speed value with the varying value at a first summing block to output a modified input speed value.

7. The method of claim 6, wherein perturbing the electric motor includes inputting the modified input speed value into a second summing block to subtract a feedback speed to output an error input to a speed controller.

8. The method of claim 6, wherein perturbing the electric motor includes using the speed controller to control a speed of the electric motor as a function of the error input, thereby varying speed of the electric motor as a function of the varying value.

9. The method of claim 8, further comprising filtering the feedback speed through one or more filter modules.

10. The method of claim 8, wherein measuring the frequency response includes measuring an output of the vibrational output of the powerplant.

11. The method of claim 1, wherein the fuel powered engine is a gas turbine engine.

12. A system for diagnosing a health of a hybrid powerplant, comprising: a health module configured to: perturb an electric motor of a hybrid powerplant having the electric motor and a fuel powered engine; measure a frequency response of the powerplant due to the perturbing of the electric motor to determine a health of the powerplant and/or one or more components thereof; and
   compare an expected frequency response to the measured frequency response to determine a health of the powerplant and/or the one or more components thereof.

13. The system of claim 12, wherein perturbing the electric motor includes modifying a set input speed value with a varying value.

14. The system of claim 13, wherein the varying value is a sinusoidal sweep.

15. A hybrid electric powerplant, comprising: an electric motor; a fuel powered engine; and a health module configured to: perturb the electric motor of the hybrid powerplant; measure a frequency response of the powerplant due to the perturbing of the electric motor to determine a health of the powerplant and/or one or more components thereof; and
   compare an expected frequency response to the measured frequency response to determine a health of the powerplant and/or the one or more components thereof.

16. The powerplant of claim 15, wherein perturbing the electric motor includes modifying a set input speed value with a varying value.

17. The powerplant of claim 15, wherein the fuel powered engine is a gas turbine engine.

\* \* \* \* \*